United States Patent
Serra et al.

(10) Patent No.: US 7,150,301 B2
(45) Date of Patent: Dec. 19, 2006

(54) MOTOR VEHICLE TIRE WITH LOW ROLLING RESISTANCE

(75) Inventors: Antonio Serra, Genoa (IT); Angela Amaddeo, Arienzo (IT); Luciano Garro, Ornago (IT); Marco Nahmias Nanni, Milan (IT)

(73) Assignee: Pirelli Pneumatici S.p.A., Milan (IT)

( * ) Notice: Subject to any disclaimer, the term of this patent is extended or adjusted under 35 U.S.C. 154(b) by 225 days.

(21) Appl. No.: 10/296,829

(22) PCT Filed: May 9, 2001

(86) PCT No.: PCT/EP01/05248

§ 371 (c)(1),
(2), (4) Date: Jul. 22, 2003

(87) PCT Pub. No.: WO01/92039

PCT Pub. Date: Dec. 6, 2001

(65) Prior Publication Data

US 2004/0016495 A1    Jan. 29, 2004

Related U.S. Application Data

(60) Provisional application No. 60/208,923, filed on Jun. 5, 2000.

(30) Foreign Application Priority Data

May 30, 2000   (EP) .................................. 00201902

(51) Int. Cl.
*B60C 1/00* (2006.01)
*B60C 9/02* (2006.01)
*B60C 13/00* (2006.01)
*B60C 15/00* (2006.01)

(52) U.S. Cl. ...................... 152/525; 152/539; 152/543; 152/548

(58) Field of Classification Search ..................... None
See application file for complete search history.

(56) References Cited

U.S. PATENT DOCUMENTS

| 4,319,619 A |   | 3/1982 | Kozima et al. |
| 4,621,118 A | * | 11/1986 | Schloman et al. .......... 525/130 |
| 5,780,538 A | * | 7/1998 | Cohen et al. ............... 524/494 |
| 5,929,157 A |   | 7/1999 | Matsuo |

FOREIGN PATENT DOCUMENTS

CA        1170556     *   7/1984

(Continued)

OTHER PUBLICATIONS

Mechanics of Pneumatic Tires, US Separtment of Transportation, Aug. 1981.*

(Continued)

*Primary Examiner*—Justin Fischer
(74) *Attorney, Agent, or Firm*—Finnegan, Henderson, Farabow, Garrett & Dunner, L.L.P.

(57) ABSTRACT

A tire for a motor vehicle includes at least one carcass ply, a belt structure radially external to the at least one carcass ply, a tread band radially external to the belt structure, a pair of sidewalls axially-external to the at least one carcass ply, and a pair of beads. The beads include bead wires or circumferentially-inextensible annular inserts. Opposite lateral edges of the at least one carcass ply are associated with respective beads. The at least one carcass ply includes a first composition having an elastic modulus at 70° C. less than or equal to 5.0 MPa and a viscous modulus at 70° C. less than or equal to 0.50 MPa. The sidewalls include a second composition having an elastic modulus at 70° C. greater than or equal to 3.5 MPa and a viscous modulus at 70° C. less than or equal to 0.50 MPa.

56 Claims, 1 Drawing Sheet

FOREIGN PATENT DOCUMENTS

| | | |
|---|---|---|
| DE | 197 43 750.8 | 4/1999 |
| EP | 0 501 227 B1 | 9/1992 |
| EP | 0 570 715 A1 | 11/1993 |
| EP | 0 928 680 A1 | 7/1999 |
| EP | 0 928 702 A1 | 7/1999 |
| EP | 0 964 028 A1 | 12/1999 |
| EP | 1 095 795 A1 | 5/2001 |
| JP | 58016904 * | 1/1983 |
| JP | 60061308 * | 4/1985 |
| JP | 60082409 * | 5/1985 |
| JP | 01106706 * | 4/1989 |
| JP | 03137141 * | 6/1991 |
| WO | WO01/60643 A1 | 8/2001 |

OTHER PUBLICATIONS

J.L. Locatelli et al., "Black to the Future", Tire Technology International, pp. 50-55, (Jun. 1999).

*Mechanics of Pneumatic Tires*, Samuel K. Clark ed., U. S. Dept. of Transportation, National Highway Traffic Safety Administration, Washington, D. C. 1981, Chapters 1, 3, and 10.

\* cited by examiner

FIG. 1

MOTOR VEHICLE TIRE WITH LOW ROLLING RESISTANCE

CROSS-REFERENCE TO RELATED APPLICATIONS

This application is a national stage entry under 35 U.S.C. § 371 from International Application No. PCT/EP01/05248, filed May 9, 2001, in the European Patent Office, the contents of which are relied upon and incorporated herein by reference; additionally, Applicants claim the right of priority under 35 U.S.C. § 119(a)–(d) based on patent application No. 00201902.4, filed May 30, 2000, in the European Patent Office; further, Applicants claim the benefit under 35 U.S.C. § 119(e) based on prior-filed, now abandoned provisional application No. 60/208,923, filed Jun. 5, 2000, in the U.S. Patent and Trademark Office.

BACKGROUND OF THE INVENTION

1. Field of the Invention

The present invention relates to a tyre, for a motor vehicle, with a low rolling resistance (R.R.). More particularly, the present invention relates to a tyre having a combination of sidewall rubber mixture/carcass ply coating rubber mixture able to reduce R.R. of the tyre.

2. Description of the Related Art

One of the most pressing requirements of motor vehicle manufacturers, with regard to the tyre performance, is a low R.R.

In view of this requirement, tyre manufacturers have hitherto made great efforts to reduce R.R. without adversely affecting other important characteristics such as handling, comfort and wear resistance.

Among the various components which make up a tyre, the component which mostly influences the R.R. is clearly the tread band since it is the component which comes into direct contact with the ground.

Therefore, during recent years, technicians in the field have concentrated their efforts on modifications of the tread rubber mixture. In particular, attempts have been made to modify hysteretic characteristics of the tread rubber mixtures by modifying, in particular, the loss factor defined as $\tan \delta = E''/E'$, where $E'$=elastic modulus (storage modulus), $E''$=viscous modulus (loss modulus). Technicians in the field consider indeed that an excellent compromise between a low R.R. and a good wet grip of the tyre can be obtained by means of a rubber mixture which has a low value of $\tan \delta$ at medium temperatures (50–70° C.) and a high value of $\tan \delta$ at low temperatures (0–10° C.).

In this respect, a particularly remarkable modification in the hysteretic behaviour of the rubber mixtures was obtained by replacing, totally or partly, conventional reinforcing fillers based on carbon black with the so-called "white fillers" and in particular with silica (see, for example, patent EP-501,227).

In addition, attempts have been made to improve the R.R. by modifying the rubber mixture of the tread underlayer and of the carcass plies or of the sidewalls of the tyre.

U.S. Pat. No. 4,319,619 describes a radial tyre in which the rubber portion of at least one carcass ply and the tread underlayer are made from a rubber having a viscoelastic property $\tan \delta \leq 0.2$ and an elastic modulus $\geq 120$ Kg/cm$^2$. In that tyre the R.R. would be reduced without worsening behaviour during braking, stability, comfort and wear resistance.

According to U.S. Pat. No. 5,929,157 the R.R. of a tyre may be reduced, without reducing wear resistance and handling on wet ground and without increasing electric resistance of the tyre as a whole, when the rubber mixture of the tyre sidewall is produced using, as a reinforcing filler, a particular type of carbon black, partly replacing carbon black with a particular type of silica and, in particular, using a specific quantity of a silane as coupling agent (col. 1, lines 32–39).

It is a common belief that hysteretic characteristics of other parts of the tyre do not have a remarkable influence on the overall R.R. of the tyre. This fact is confirmed by calculations on models performed using finite-element analysis [see, for example, J. L. Locatelli and Y. De Puydt in "Tire Technology International" (June 1999, pages 50–55)].

Modification of other parts of the tyre in order to reduce the R.R. is also not recommended since, in an attempt of achieving a possible slight improvement in the R.R., a risk is run of negatively influencing other important characteristics and, therefore, of worsening the overall tyre performance.

SUMMARY OF THE INVENTION

The Applicants have now perceived that the rubber mixture coating the carcass ply and the rubber mixture of the sidewalls may exert a synergistic effect in reducing R.R. of a tyre without adversely affecting the other characteristics of the tyre such as, in particular, handling and comfort.

The Applicants have also found that the above mentioned goal may be achieved by means of a rubber mixture for coating the carcass ply having $E'$ at 70° C. $\leq 5.0$ MPa and $E''$ at 70° C. $\leq 0.50$ MPa and a rubber mixture for the sidewalls having $E'$ at 70° C. $\geq 3.5$ MPa and $E''$ at 70° C. $\leq 0.50$ MPa.

Therefore, according to a first aspect, the present invention relates to a tyre for a motor vehicle having a low rolling resistance, said tyre comprising at least a tread band, a rubber-coated carcass ply, whose opposite lateral edges are associated with respective right-hand and left-hand bead wires, each bead wire being incorporated in a respective bead, a belt structure applied along the circumferential extension of said rubber-coated carcass ply, right-hand and left-hand sidewalls applied externally on said rubber-coated carcass ply and extending, in an axially external position, from the respective bead to the respective end of the belt structure, characterized in that said carcass ply is coated by a rubber mixture having $E'$ at 70° C. $\leq 5.0$ MPa and $E''$ at 70° C. $\leq 0.50$ MPa, and said sidewalls are formed by a rubber mixture having $E'$ at 70° C. $\geq 3.5$ MPa and $E''$ at 70° C. $\leq 0.50$ MPa.

Preferably, said rubber mixture for coating said carcass ply has a value of $E'$ at 70° C. $\leq 4.5$ MPa and, even more preferably, of from 1.5 to 4.0 MPa and a value of $E''$ at 70° C. of from 0.10 to 0.45 MPa and, even more preferably, of from 0.20 to 0.40 MPa.

In turn, said rubber mixture for the sidewalls has preferred values of $E'$ at 70° C. of from 4.0 to 10.0 MPa, even more preferably, of from 4.5 to 6.0 MPa, and a value of $E''$ at 70° C. of from 0.10 to 0.48, even more preferably, of from 0.20 to 0.45 MPa.

According to the present invention, the rubber mixture for coating the carcass ply is, preferably, based on natural rubber (NR), optionally in combination with at least one synthetic rubber, while the rubber mixture for the sidewalls is, preferably, based on a mixture of natural rubber (NR) and at least one synthetic rubber.

Typically, the synthetic rubber is an elastomeric diolefin polymer which can be obtained by means of solution or emulsion polymerization of one or more conjugated diene monomers, optionally in admixture with a vinylaromatic hydrocarbon, the latter being present in the polymer in a quantity generally not greater than 50% by weight, relative to the total weight of the polymer.

Preferably, the elastomeric diene polymer contains from 30 to 70% by weight, relative to the total weight of the polymer, of diolefin units having a 1,2-structure.

For the purposes of the invention, the conjugated diene monomer is preferably selected from the group comprising: 1,3-butadiene, isoprene, 2,3-dimethyl-1,3-butadiene, 1,3-pentadiene, 1,3-hexadiene, and mixtures thereof, while the vinylaromatic hydrocarbon is preferably selected from the group comprising: styrene, α-methylstyrene, p-methylstyrene, vinyltoluene, vinylnaphthalene, vinylpyridine, and mixtures thereof.

In the present description the expression "diolefin units having a 1,2-structure" is used to indicate that fraction of units deriving from 1,2-polymerization of the conjugated diene monomer. For example, when the conjugated diene monomer is 1,3-butadiene, the above mentioned diolefin units having a 1,2-structure have the following structural formula:

Preferably, the elastomeric diolefin polymer is selected from the group comprising styrene/1,3-butadiene copolymers (SBR), poly-1,3-butadiene (BR), styrene/isoprene copolymers and the like, or mixtures thereof.

Preferably, the polymer base of the rubber mixture for coating the carcass ply according to the invention comprises from 50 to 100 phr of NR, from 0 to 30 phr of BR and from 0 to 30 phr of SBR.

Preferably, the polymer base of the rubber mixture for the sidewalls according to the invention comprises from 30 to 70 phr of NR, from 30 to 70 phr of BR and from 0 to 20 phr of SBR.

In the present description and the following claims, the expression "phr" (per hundred rubber) means that the quantities of the various components are expressed as parts by weight per 100 parts by weight of elastomer base.

Advantageously, the rubber mixtures for coating the carcass ply and for the sidewalls according to the invention also comprise carbon black, as a reinforcing filler, in a quantity generally of from 30 to 60 phr, preferably from 35 to 55 phr.

Typical examples of carbon black which can be used in the rubber mixtures of the tyre according to the present invention are those which are identified by the abbreviations N110, N121, N134, N220, N231, N234, N299, N326, N330, N339, N347, N351, N358, N375 and N660 in accordance with the ASTM standards.

In the case of the rubber mixtures for coating the carcass ply and for the sidewalls of the tyre according to the present invention, preference is given to carbon blacks of the series No. 3, such as the types N326 and N375, and those of the series No. 6, such as N660.

Of course, the rubber mixtures of the tyre according to the present invention may also comprise sulphur and/or other conventional vulcanizing agents, as well as other conventional components or additives such as activators, plasticizers, antioxidants, accelerators and the like.

Typically, the plasticizers may be selected from those commonly used in the known art. Advantageously, they are selected from mineral oils, vegetable oils, synthetic oils and the like, or mixtures thereof, for example: aromatic oils, naphthenic oils, phthalates, soybean oil and the like.

According to the invention, in the rubber mixtures for coating the carcass ply the quantity of plasticizer generally ranges from 2 to 20 phr, preferably from 5 to 15 phr, while in the rubber mixtures for the sidewalls the quantity of plasticizer is generally lower than 7 phr, preferably from 0 to 5 phr.

Moreover, the rubber mixture for coating the carcass ply preferably comprises also at least an agent for promoting bonding between the reinforcing cords and the coating rubber mixture. Products known in the art may be used as bonding promoters, such as: thermosetting resins, cobalt salts, cobalt-nickel complexes, or mixtures thereof.

Advantageously, the tyre according to the present invention may also have one or more of the following structural characteristics:
a) an underlayer obtained from a rubber mixture having a loss factor (tan δ=E"/E') at 70° C.≦0.120 and an elastic modulus E' at 70° C. of from 5.0 to 14.0 MPa. Preferably, the value of said loss factor at 70° C. is from 0.020 to 0.100 and, even more preferably, from 0.030 to 0.070, while the value of said elastic modulus E' at 70° C. is preferably from 6.5 to 10.0 MPa, even more preferably from 7.0 to 9.0 MPa;
b) an anti-abrasive band obtained from a rubber mixture having a loss factor (tan δ=E"/E') at 70° C.≦0.130 and an elastic modulus E' at 70° C.≧6.0 MPa. Preferably, the value of said loss factor at 70° C. is from 0.050 to 0.120, even more preferably from 0.080 to 0.110, while the value of said elastic modulus E' at 70° C. is preferably from 6.5 to 18.0 MPa, even more preferably from 7.0 to 12.0 MPa;
c) a reinforcing structure at 0° incorporating at least one reinforcing cord coated by a rubber mixture having an elastic modulus E' at 70° C. of from 2.5 to 9.0 MPa, and a viscous modulus E" at 70° C.≦0.50 MPa. Preferably, the value of said elastic modulus E' at 70° C. is from 3.0 to 8.0 MPa, even more preferably from 3.5 to 7.0 MPa, while the value of said viscous modulus E" at 70° C. is preferably from 0.10 to 0.48 MPa, even more preferably from 0.20 to 0.45 MPa.

As regards preferred embodiments of the above-mentioned underlayer and the above-mentioned anti-abrasive band, reference is made to European Patent Application No. EP 1,095,795, published 02 May 2001, and World Intellectual Property Organization Publication No. WO 01/60,643, published 23 Aug. 2001, in the name of PIRELLI PNEUMATICI S.p.A., which are incorporated herein for reference purposes.

A typical characteristic of the rubber mixtures of the above mentioned underlayer and anti-abrasive band is that of comprising a component which is capable of increasing their elastic modulus value E' at 70° C. such as, for example, a thermosetting resin selected from the group comprising resorcinol/methylene-donating compound resins, epoxy resins, alkyd resins and mixtures thereof.

The suitable quantity of said thermosetting resin varies from case to case depending on parameters which are well-known to the technicians in the field such as, for example, the number of crosslinking groups present in the thermosetting resin used and/or its nature (dual-component or in precondensed form).

Preferably, said thermosetting resin is of the type resorcinol+methylene donor or in the form of two components which form the thermosetting resin in situ or in the precondensed form (condensed before being added to the rubber mixture). Typically, the methylene donor is hexamethoxymethylmelamine (HMMM) or hexamethylenetetramine (HMT). In the case of HMMM its ratio by weight, relative to resorcinol, ranges from 0.5 to 3.

Alternatively, thermosetting resins of another type may be used, such as, for example, epoxide/polyol, epoxide/diamine, epoxide/carboxylic acid or alcohol/diacid (alkyl resins). In this case also, the two components which are condensed in situ or the separately precondensed resin may be added to the rubber mixture.

In a preferred embodiment, the tyre according to the invention comprises a tread band with a low R.R. obtained by moulding a rubber mixture having a value of the loss factor tan δ at 70° C.≦0.140, preferably ≦0.120, and an elastic modulus value E' at 70° C. of from 5.0 to 8.0 MPa, preferably from 5.5 to 7.0 MPa.

BRIEF DESCRIPTION OF THE DRAWINGS

The values of the elastic properties mentioned in the present description and in the claims were measured under dynamic conditions.

More particularly, the values of the modulus of elasticity E' and of the loss modulus E" were determined using commercially available apparatuses made by INSTRON.

The measurements effected using the dynamic INSTRON were performed under the following conditions:

cylindrical test-piece (length 25 mm and diameter 14 mm)
pre-deformation: 20%
imposed deformation: 7.5%
frequency: 100 Hz The hardness in IRHD degrees was determined on test-pieces of the rubber mixture (vulcanized at 151° C. for 30 minutes) in accordance with ISO standard 48.

Characteristic features and advantages of the invention will now be illustrated with reference to an example of embodiment shown by way of a non-limiting example in the accompanying FIG. 1 which shows a cross-sectional view of a portion of a tyre manufactured in accordance with the invention.

DETAILED DESCRIPTION OF THE PREFERRED EMBODIMENTS

Figure 1:
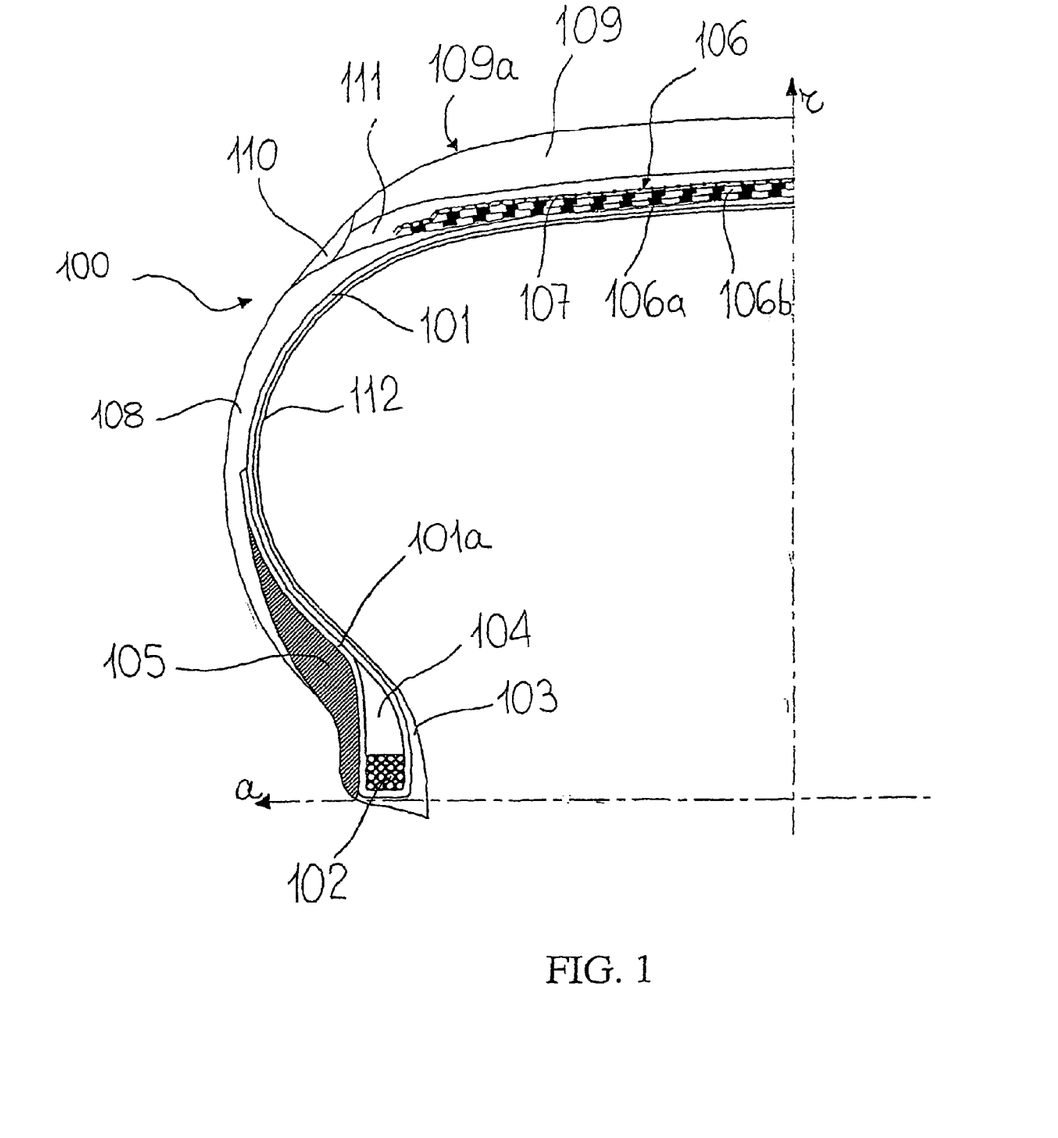

With "a" an axial direction is indicated, with "r" a radial direction is indicated. For the sake of simplicity, FIG. 1 shows only a portion of the tyre, the remaining portion not shown being identical and symmetrically arranged with respect to the radial direction "r".

The tyre (100) comprises at least one rubber-coated carcass ply (101), whose opposite lateral edges are associated with respective bead wires (102). The coupling between carcass ply (101) and bead wires (102) is usually performed by folding back the opposite lateral edges of the carcass ply (101) around the bead wires (102), so as to form the so-called carcass folds (101a), as shown in FIG. 1.

Alternatively, the conventional bead wires (102) may be replaced by a pair of circumferentially unextensible annular inserts formed by elongated elements arranged in concentric coils (not shown in FIG. 1) (see, for example, European patent applications EP-A-0,928,680 and EP-A-0,928,702). In this case, the carcass ply (101) is not folded around said annular inserts, coupling being provided by a second carcass ply (not shown in FIG. 1), applied on the outside of the first ply.

The rubber-coated carcass ply (101) is generally formed by a plurality of reinforcing cords arranged parallel to each other and at least partially coated with a layer of an elastomeric mixture. These reinforcing cords usually consist of steel wires which are stranded together and coated with a metal alloy (for example copper/zinc, zinc/manganese, zinc/molybdenum/cobalt and the like).

The rubber-coated carcass ply (101) is usually of the radial type, i.e. incorporates reinforcing cords arranged in a direction substantially perpendicular with respect to a circumferential direction. Each bead wire (102) is incorporated in a bead (103), defined along an internal circumferential edge of the tyre (100), where engagement of the tyre itself occurs onto a rim (not shown in FIG. 1) forming part of a vehicle wheel. The space defined by each carcass fold (101a) contains a bead filling element (104) in which the bead wires (102) are embedded. An anti-abrasive band (105) is usually arranged in a position axially on the outside with respect to the carcass fold (101a).

Alternative processes for the production of a tyre or parts thereof without using semi-finished products are described, for example, in the above mentioned patent applications EP-A-0,928,680 and EP-A-0,928,702.

A belt structure (106) is applied along the circumferential extension of the rubber-coated carcass ply (101). In the particular embodiment according to FIG. 1, the belt structure (106) comprises two belt strips (106a, 106b) which incorporate a plurality of typically metal reinforcing cords which are parallel to each other in each strip and intersecting with respect to the adjacent strip, being oriented so as to form a predetermined angle with respect to a circumferential direction. At least one reinforcing layer (107) at zero degrees may optionally be applied onto the radially outermost belt strip (106b), said reinforcing layer generally incorporating a plurality of typically textile reinforcing cords arranged at an angle of a few degrees with respect to a circumferential direction.

A sidewall (108) is also applied on the outside of the rubber-coated carcass ply (101), said sidewall extending, in an axially external position, from the bead (103) to the end of the belt structure (106).

A tread band (109), whose lateral edges are connected to the sidewalls (108), is circumferentially applied in a position radially external to the belt structure (106). Outwardly, the tread band (109) has a rolling surface (109a) intended to come into contact with the ground. Said surface (109a), which for the sake of simplicity is shown as being smooth in FIG. 1, is generally provided with circumferential grooves which are connected by transverse notches (not shown) so as to define a plurality of blocks of various shapes and dimensions distributed over the rolling surface (109a).

A rubber strip (110) (called "mini-sidewall") may optionally be provided in the connecting zone between sidewalls (108) and tread band (109), which is generally obtained by coextrusion with the tread band and improves mechanical interaction between tread band (109) and sidewalls (108). Alternatively, the end part of the sidewall (108) directly covers the lateral edge of the tread band (109). An underlayer (111) which forms, together with the tread band (109), a structure known as a "cap and base", may optionally be arranged between the belt structure (106) and the tread band (109).

In the case of tubeless tyres, a rubber layer (112), generally called "liner", may also be provided in a radially internal position with respect to the rubber-coated carcass ply (101), said liner ensuring the required impermeability with respect to the air inflating the tyre.

The tyre according to the present invention may be produced by means of any method known in the art, including at least one step involving preparation of the raw tyre and at least one step of vulcanization thereof.

More particularly, the tyre production method comprises the steps of preparing, preliminary and separately from each other, a series of semi-finished components corresponding to the different parts of the tyre (carcass ply, belt structure, bead wires, filling elements, sidewalls and tread band) which are then assembled together by means of a suitable assembly machine. Then the following vulcanization step bonds together the above mentioned semi-finished components so as to form a monolithic block, i.e. the finished tyre.

Of course, the step involving preparation of the above mentioned semi-finished components is preceded by a step of preparing and forming the relevant rubber mixtures constituting said semi-finished components, according to conventional techniques.

The raw tyre thus obtained is then subjected to the subsequent moulding and vulcanization steps. For this purpose, a vulcanization mould is used, said mould being designed to receive the tyre being processed inside a moulding cavity having counter-shaped walls which define the external surface of the tyre, once crosslinking has been completed. Moulding of the raw tyre may be performed by injecting, into the space defined by the internal surface of the tyre, a fluid under pressure for pressing the external surface of the raw tyre against the walls of the moulding cavity. At this point the step of vulcanizing the uncured elastomeric material present in the tyre is performed. For this purpose the external wall of the vulcanization mould is brought into contact with a heating fluid (generally steam) so that the external wall reaches a maximum temperature generally of from 100° C. to 200° C. Simultaneously, the internal surface of the tyre is heated to the vulcanization temperature using the same fluid under pressure used to press the tyre against the walls of the moulding cavity. Once vulcanization has been completed, the tyre is extracted from the vulcanization mould.

In a preferred embodiment of the present invention, coating the carcass ply (101) is carried out using a rubber mixture having the composition and the physical characteristics indicated in Table I. In turn, the sidewalls (108) are obtained using a rubber mixture having the composition and the physical characteristics indicated in Table II.

In turn, Table I compares the composition of a rubber mixture for coating the carcass ply (101) according to the invention (CI) with that of a comparative coating rubber mixture (CC) of the conventional type.

Table II compares the composition of a rubber mixture for a sidewall (108) according to the invention (FI) with that of a comparative rubber mixture (FC) of the conventional type.

The numerical values in Tables I and II indicate the quantities of each component expressed in phr.

TABLE I

Carcass Ply Coating Rubber Mixture

| Components | CC | CI |
|---|---|---|
| NR (natural rubber) | 100 | 65 |
| BR (Europrene ™ Neocis manufactured by Enichem: polybutadiene with high cis isomer content) | | 20 |
| SBR1712 (Europrene ™ 1712 manufactured by Enichem: butadiene/styrene copolymer prepared in emulsion) | | 15 |
| N375 | 54 | |
| N660 | | 50 |
| Aromatic oil | 4 | 10 |
| Stearic acid | 1.5 | 2 |
| ZnO | 6 | 3.5 |
| Antioxidants | 1 | 3 |
| HMMM | | 1.62 |
| HMT | 1.54 | |
| Resorcinol | 1.26 | 1 |
| Accelerators | 1 | 1 |
| Sulphur | 1.81 | 1.8 |
| Stress at 100% Elongation (MPa) | 3.5 | 2.2 |
| Stress at 300% Elongation (MPa) | 17.2 | 9.75 |
| Stress at Break (MPa) | 21.2 | 17.25 |
| Elongation at Break % | 384 | 517 |
| IHRD 23 ° C. | 75.4 | 61.2 |
| IHRD 100° C. | 71 | 59.2 |
| E' 23° C. (Mpa) | 7.92 | 4.2 |
| E' 70° C. (Mpa) | 7.0 | 3.88 |
| E" 23° C. (MPa) | 1.24 | 0.62 |
| E" 70° C. (MPa) | 0.64 | 0.341 |

TABLE II

Sidewall Rubber Mixture

| Components | FC | FI |
|---|---|---|
| NR (natural rubber) | 40 | 40 |
| BR (Europrene ™ Neocis manufactured by Enichem) | 60 | 60 |
| N375 | 30.5 | |
| N660 | 30.5 | 50 |
| Aromatic oil | 18.6 | |
| Stearic acid | 2 | 2 |
| ZnO | 3 | 3 |
| Antioxidants | 4 | 4 |
| Wax | 3 | 3 |
| Accelerators | 0.7 | 0.7 |
| Sulphur | 1.8 | 1.8 |
| Stress at 100% Elongation (MPa) | 1.15 | 2.14 |
| Stress at 300% Elongation (MPa) | 6 | 9.59 |
| Stress at break (MPa) | 12.7 | 13.6 |
| Elongation at Break % | 556 | 409 |
| IHRD 23° C. | 51.8 | 63.3 |
| IHRD 100° C. | 47.9 | 58.8 |
| E' 23° C. (MPa) | 3.9 | 5.18 |
| E' 70° C. (MPa) | 3.22 | 4.7 |
| E" 23° C. (MPa) | 0.824 | 0.881 |
| E" 70° C. (MPa) | 0.558 | 0.419 |

Tables I and II show that, compared to the known comparative rubber mixtures, the elastic modulus (E' at 70° C.) of the carcass coating rubber mixture has been reduced, while that of the sidewall rubber mixture has been increased.

The tyre according to the invention (PI) was compared with an identical tyre of the conventional type (PT), the sole variation consisting in the composition of the rubber mixtures for the carcass ply coating and the sidewalls which, in the case of the conventional tyre (P6000 powergy™ PIRELLI®), were CC and FC, whereas, in the case of the tyre according to the invention, they were CI and FI (Tables I–II). Moreover, in order to evaluate the synergistic effect of the invention, two comparison tyres which were entirely identical to the conventional tyre (P6000 powergy™ PIRELLI®) were evaluated, except that, in the case of the first comparison tyre ($P_{C1}$), the rubber mixture for the carcass ply coating was of the type CI and in the second case ($P_{C2}$) the rubber mixture of the sidewalls was of the type FI.

The size of both tyres was 195/65 R15.

All the tyres in the test had a tread band with a low R.R., obtained by moulding a rubber mixture consisting of:

| | | |
|---|---|---|
| SBR 5025 | 84 | phr |
| BR40 | 39 | " |
| Silica | 70 | " |
| X50S | 11.2 | " |
| Stearic acid | 2 | " |
| Aromatic oil | 5 | " |
| ZnO | 2.5 | " |
| Antioxidants | 2 | " |
| Microcryst. wax | 1 | " |
| Sulphur | 1.4 | " |
| Accelerators | 3.7 | " |

Said rubber mixture after vulcanization had a value for the loss factor tan δ at 70° C. equal to 0.112 and a value of E' at 70° C. equal to 6.2 MPa.

The tyres were subjected to a series of standard tests in order to evaluate their rolling resistance and their performance on the road: soft handling (driving in normal conditions), hard handling (driving in extreme conditions) and comfort.

The rolling resistance was evaluated in accordance with the standards ISO 8767 and in particular using the so-called "Torque Method" indicated in section 7.2.2. of said standard, using conventional laboratory apparatus.

The measurements were performed at a constant speed of 100 km/h, where the parasitic losses were measured using the "Skim Reading" method indicated in section 6.6.1. of the above mentioned standard ISO 8767.

The results are shown in Table III.

Evaluation of the performance in terms of comfort, handling in normal conditions (soft handling) and handling in extreme conditions (hard handling) was carried out on the test track at Vizzola, with the tyres being mounted on Audi A3 cars with a piston displacement of 1600 cm$^3$. The four types of tyres under examination (PI, PT, $P_{C1}$ and $P_{C2}$) were tested by two independent test drivers who gave a rating, based on their subjective opinion and ranging from zero to ten, as to the handling and comfort in normal and extreme driving conditions. In this connection, the expression "extreme driving conditions" indicates the execution, by a test driver, of all those manoeuvres which an average driver may have to perform in unexpected and dangerous conditions: abrupt steering movements at high speed, sudden changes in travelling direction to avoid obstacles, sudden braking, and the like.

Also in this case, to the overall opinion expressed for the conventional tyre (PT) an index of 100 was attributed for soft handling, hard handling and comfort, while a percentage increase in this index was awarded to the three tyres PI, $P_{C1}$ and $P_{C2}$ depending on the corresponding improvement in performance in terms of handling and comfort encountered during testing. In other words, the higher the index, the better the performance of the tyre under examination.

The results thus obtained are shown in Table III.

TABLE III

| | PT | $P_{c1}$ | $P_{c2}$ | PI |
|---|---|---|---|---|
| R. R. (Kg/ton) | 9.36 | 9.23 | 9.26 | 9.02 |
| Variation in R. R. (Kg/ton) | | −0.11 | −0.13 | −0.34 |
| Soft handling | 100 | 100 | 103 | 103 |
| Hard handling | 100 | 90 | 100 | 117 |
| Comfort | 100 | 103 | 102 | 104 |

In another preferred embodiment, the tyre according to the present invention, besides having a carcass ply (101) coating obtained with a rubber mixture having the composition and the physical characteristics indicated in Table I and sidewalls (108) obtained with a rubber mixture having the composition and the physical characteristics indicated in Table II, is additionally provided with an underlayer (111) obtained from a rubber mixture having the composition and the physical characteristics indicated in Table IV, an anti-abrasive band (105) obtained from a rubber mixture having the composition and the physical characteristics indicated in Table V, and a reinforcing structure (107) at 0° incorporating a plurality of nylon cords coated by the same rubber mixture as in Table I, used for coating the carcass ply (101).

Moreover, Tables IV and V compare the compositions of a rubber mixture of an underlayer (111) according to the invention (SI) and of an anti-abrasive band (105) according to the invention (LI) with a rubber mixture of a comparative underlayer (SC) and of a comparative anti-abrasive band (LC) of the conventional type, respectively.

TABLE IV

| Underlayer Rubber Mixture | | |
|---|---|---|
| Components | SC | SI |
| NR (natural rubber) | 50 | 60 |
| BR (Europrene ™ Neocis manufactured by Enichem) | | 20 |
| NS116 (terminated and coupled butadiene/styrene copolymer prepared in solution - Nippon Zeon) | | 20 |
| SBR1712 (Europrene ™ 1712 - Enichem) | 50 | |
| N375 | | 35 |
| N660 | 60 | |
| Stearic acid | 1 | 2 |
| ZnO | 2.5 | 3 |
| Antioxidants | 1.5 | 2.5 |
| Resorcinol | | 2 |
| HMMM | | 2 |
| Accelerators | 1.25 | 1.2 |
| Sulphur | 2.01 | 4.02 |
| Anti-reversion agent (1,3-bis(citraconimidomethyl) benzene - product Perkalink ™ 900 - Flexys) | | 1.5 |
| X50S (50% by weight mixture of bis(3-triethoxysilylpropyl) tetrasulphide - Degussa) | | 2 |
| Stress at 100% Elongation (MPa) | 3.36 | 4.6 |
| Stress at 300% Elongation (MPa) | 12.1 | |
| Stress at break (MPa) | 14.1 | 9.6 |
| Elongation at Break % | 385 | 190 |
| IHRD 23° C. | 67 | 75.7 |
| IHRD 100° C. | 62 | 72.6 |
| E' 23° C. (MPa) | 5.99 | 9.06 |
| E' 70° C. (Mpa) | 4.2 | 7.76 |
| E" 23° C. (MPa) | 1.81 | 0.93 |
| E" 70° C. (MPa) | 0.571 | 0.427 |
| Tanδ 23° C. | 0.302 | 0.103 |
| Tanδ 70° C. | 0.136 | 0.055 |

TABLE V

Anti-abrasive Band Rubber Mixture

| Components | LC | LI |
|---|---|---|
| NR | 60 | 60 |
| BR | 40 | 40 |
| N375 | 82 | |
| N234 | | 40 |
| Stearic acid | 2 | 2 |
| ZnO | 3.5 | 3.5 |
| Resorcinol | | 2 |
| HMMM | | 2.01 |
| Oil | 16 | |
| Antioxidants | 2.9 | 2.9 |
| Process additives | 3 | 3 |
| Accelerators | 1.4 | 1.4 |
| Sulphur | 2.51 | 2.51 |
| Stress at 100% Elongation (MPa) | 3.16 | 3.59 |
| Stress at 300% Elongation (MPa) | 15.4 | 11.7 |
| Stress at Break (MPa) | 16.6 | 14.3 |
| Elongation at Break % | 350 | 340 |
| IHRD 23° C. | 80.1 | 79.3 |
| IHRD 100° C. | 73.9 | 73.4 |
| E' 23° C. (MPa) | 9.62 | 8.83 |
| E' 70° C. (MPa) | 8 | 7.65 |
| E" 23° C. (MPa) | 2.3 | 1.23 |
| E" 70° C. (MPa) | 1.39 | 0.788 |
| Tan$\delta$ 23° C. | 0.239 | 0.139 |
| Tan$\delta$ 70° C. | 0.174 | 0.103 |

Five tyres of the type P3000 175/65 R14 were produced using the above described rubber mixtures, which were subjected to a series of standard tests in order to evaluate their rolling resistance and their performance on the road, the tyres being mounted on a FIAT Brava car with a piston displacement of 1,400 cm$^3$. Also in this case the tested tyres had a tread band with a low R.R. such as that reported above.

Table VI shows the various combinations and the results of the tests. The abbreviations indicated in Table VI have the meanings reported above, while the new abbreviations NC and NI indicate, respectively, the conventional and the new rubber mixtures for coating the cords of the reinforcing structure (107) at 0°. As already mentioned, in this embodiment these rubber mixtures are the same as those in Table I already used for coating the carcass ply (101). Therefore, the rubber mixtures NC and NI are identical to the rubber mixtures CC and CI.

TABLE VI

| | P1 | P2 | P3 | P4 | P5 |
|---|---|---|---|---|---|
| Sidewall | FC | FI | FI | FI | FI |
| Carcass | CC | CI | CI | CI | CI |
| Cords at 0° | NC | NC | NI | NI | NI |
| Underlayer | SC | SC | SC | SI | SI |
| Anti-abrasive band | LC | LC | LC | LC | LI |
| Soft handling | 100 | 99 | 95 | 98 | 98 |
| Hard handling | 100 | 101 | 98 | 98 | 97 |
| Comfort | 100 | 98 | 102 | 101 | 103 |
| R. R. (Kg/ton) | 8.5 | 8.05 | 7.8 | 7.6 | 7.4 |

The invention claimed is:

1. A tyre for a motor vehicle, comprising:
at least one carcass ply;
a belt structure in a radially-external position relative to the at least one carcass ply;
a tread band in a radially-external position relative to the belt structure;
a pair of sidewalls in axially-external positions relative to the at least one carcass ply; and
a pair of beads;
wherein the beads comprise bead wires or circumferentially-inextensible annular inserts,
wherein opposite lateral edges of the at least one carcass ply are associated with respective beads,
wherein the at least one carcass ply comprises a first composition comprising an elastic modulus at 70° C. less than or equal to 5.0 MPa and a viscous modulus at 70° C. less than or equal to 0.50 MPa, and
wherein the sidewalls comprise a second composition comprising an elastic modulus at 70° C. greater than or equal to 3.5 MPa and a viscous modulus at 70° C. less than or equal to 0.50 MPa.

2. The tyre of claim 1, wherein the first and second compositions are the same.

3. The tyre of claim 1, wherein the first composition comprises an elastic modulus at 70° C. less than or equal to 4.5 MPa.

4. The tyre of claim 1, wherein the first composition comprises an elastic modulus at 70° C. greater than or equal to 1.5 MPa and less than or equal to 4.0 MPa.

5. The tyre of claim 1, wherein the first composition comprises a viscous modulus at 70° C. greater than or equal to 0.10 MPa and less than or equal to 0.45 MPa.

6. The tyre of claim 1, wherein the first composition comprises a viscous modulus at 70° C. greater than or equal to 0.20 MPa and less than or equal to 0.40 MPa.

7. The tyre of claim 1, wherein the second composition comprises an elastic modulus at 70° C. greater than or equal to 4.0 MPa and less than or equal to 10.0 MPa.

8. The tyre of claim 1, wherein the second composition comprises an elastic modulus at 70° C. greater than or equal to 4.5 MPa and less than or equal to 6.0 MPa.

9. The tyre of claim 1, wherein the second composition comprises a viscous modulus at 70° C. greater than or equal to 0.10 MPa and less than or equal to 0.48 MPa.

10. The tyre of claim 1, wherein the second composition comprises a viscous modulus at 70° C. greater than or equal to 0.20 MPa and less than or equal to 0.45 MPa.

11. The tyre of claim 1, wherein the first composition comprises:
natural rubber in an amount greater than or equal to 50 phr and less than or equal to 100 phr;
butadiene rubber in an amount greater than or equal to 0 phr and less than or equal to 30 phr; and
styrene-butadiene rubber in an amount greater than or equal to 0 phr and less than or equal to 30 phr.

12. The tyre of claim 11, wherein the first composition further comprises carbon black in an amount greater than or equal to 30 phr and less than or equal to 60 phr.

13. The tyre of claim 11, wherein the first composition further comprises carbon black in an amount greater than or equal to 35 phr and less than or equal to 55 phr.

14. The tyre of claim 11, wherein the first composition further comprises a plasticizer in an amount greater than or equal to 2 phr and less than or equal to 20 phr.

15. The tyre of claim 11, wherein the first composition further comprises a plasticizer in an amount greater than or equal to 5 phr and less than or equal to 15 phr.

16. The tyre of claim 11, wherein the first composition further comprises at least one agent to promote bonding between the first composition and cords of the at least one carcass ply.

17. The tyre of claim 16, wherein the at least one agent comprises one or more:

thermosetting resins, or
cobalt salts, or
cobalt-nickel complexes, or
mixtures of thermosetting resins and cobalt salts, or
mixtures of thermosetting resins and cobalt-nickel complexes, or
mixtures of cobalt salts and cobalt-nickel complexes, or
mixtures of thermosetting resins, cobalt salts, and cobalt-nickel complexes.

18. The tyre of claim 1, wherein the second composition comprises:
natural rubber in an amount greater than or equal to 30 phr and less than or equal to 70 phr;
butadiene rubber in an amount greater than or equal to 30 phr and less than or equal to 70 phr; and
styrene-butadiene rubber in an amount greater than or equal to 0 phr and less than or equal to 20 phr.

19. The tyre of claim 18, wherein the second composition further comprises carbon black in an amount greater than or equal to 30 phr and less than or equal to 60 phr.

20. The tyre of claim 18, wherein the second composition further comprises carbon black in an amount greater than or equal to 35 phr and less than or equal to 55 phr.

21. The tyre of claim 18, wherein the second composition further comprises a plasticizer in an amount less than 7 phr.

22. The tyre of claim 18, wherein the second composition further comprises a plasticizer in an amount greater than or equal to 0 phr and less than or equal to 5 phr.

23. The tyre of claim 1, further comprising an underlayer disposed between the belt structure and the tread band, wherein the underlayer comprises a third composition comprising an elastic modulus at 70° C. greater than or equal to 5.0 MPa and less than or equal to 14.0 MPa and a first ratio of a viscous modulus at 70° C. of the third composition to the elastic modulus at 70° C. of the third composition less than or equal to 0.120:1.

24. The tyre of claim 23, wherein the first and second compositions are the same, or
wherein the first and third compositions are the same, or
wherein the second and third compositions are the same, or
wherein the first, second, and third compositions are the same.

25. The tyre of claim 23, wherein the third composition comprises an elastic modulus at 70° C. greater than or equal to 6.5 MPa and less than or equal to 10.0 MPa.

26. The tyre of claim 23, wherein the third composition comprises an elastic modulus at 70° C. greater than or equal to 7.0 MPa and less than or equal to 9.0 MPa.

27. The tyre of claim 23, wherein the first ratio is greater than or equal to 0.020 and less than or equal to 0.100.

28. The tyre of claim 23, wherein the first ratio is greater than or equal to 0.030 and less than or equal to 0.070.

29. The tyre of claim 23, wherein the third composition comprises a component increasing the elastic modulus at 70° C. of the third composition.

30. The tyre of claim 29, wherein the component comprises a thermosetting resin.

31. The tyre of claim 30, wherein the thermosetting resin comprises resorcinol plus a methylene donor.

32. The tyre of claim 31, wherein the methylene donor comprises hexamethoxymethylmelamine.

33. The tyre of claim 1, further comprising one or more anti-abrasive bands disposed in axially-external positions relative to the at least one carcass ply, wherein the one or more anti-abrasive bands comprise a fourth composition comprising an elastic modulus at 70° C. greater than or equal to 6.0 MPa and a second ratio of a viscous modulus at 70° C. of the fourth composition to the elastic modulus at 70° C. of the fourth composition less than or equal to 0.130:1.

34. The tyre of claim 33, wherein the first and second compositions are the same, or
wherein the second and fourth compositions are the same.

35. The tyre of claim 33, wherein the fourth composition comprises an elastic modulus at 70° C. greater than or equal to 6.5 MPa and less than or equal to 18.0 MPa.

36. The tyre of claim 33, wherein the fourth composition comprises an elastic modulus at 70° C. greater than or equal to 7.0 MPa and less than or equal to 12.0 MPa.

37. The tyre of claim 33, wherein the second ratio is greater than or equal to 0.050 and less than or equal to 0.120.

38. The tyre of claim 33, wherein the second ratio is greater than or equal to 0.080 and less than or equal to 0.110.

39. The tyre of claim 33, wherein the fourth composition comprises a component increasing the elastic modulus at 70° C. of the fourth composition.

40. The tyre of claim 39, wherein the component comprises a thermosetting resin.

41. The tyre of claim 40, wherein the thermosetting resin comprises resorcinol plus a methylene donor.

42. The tyre of claim 41, wherein the methylene donor comprises hexamethoxymethylmelamine.

43. The tyre of claim 1, further comprising at least one reinforcing layer disposed between the belt structure and the tread band, wherein the at least one reinforcing layer comprises a fifth composition comprising an elastic modulus at 70° C. greater than or equal to 2.5 MPa and less than or equal to 9.0 MPa and a viscous modulus at 70° C. less than or equal to 0.50 MPa.

44. The tyre of claim 43, wherein the at least one reinforcing layer comprises at least one cord circumferentially disposed around the belt structure approximately parallel to an equatorial plane of the tyre.

45. The tyre of claim 43, wherein the first and second compositions are the same, or
wherein the first and fifth compositions are the same, or
wherein the second and fifth compositions are the same, or
wherein the first, second, and fifth compositions are the same.

46. The tyre of claim 43, wherein the fifth composition comprises an elastic modulus at 70° C. greater than or equal to 3.0 MPa and less than or equal to 8.0 MPa.

47. The tyre of claim 43, wherein the fifth composition comprises an elastic modulus at 70° C. greater than or equal to 3.5 MPa and less than or equal to 7.0 MPa.

48. The tyre of claim 43, wherein the fifth composition comprises a viscous modulus at 70° C. greater than or equal to 0.10 MPa and less than or equal to 0.48 MPa.

49. The tyre of claim 43, wherein the fifth composition comprises a viscous modulus at 70° C. greater than or equal to 0.20 MPa and less than or equal to 0.45 MPa.

50. The tyre of claim 1, wherein the tread band comprises a sixth composition comprising an elastic modulus at 70° C. greater than or equal to 5.0 MPa and less than or equal to 8.0 MPa and a third ratio of a viscous modulus at 70° C. of the sixth composition to the elastic modulus at 70° C. of the sixth composition less than or equal to 0.140:1.

51. The tyre of claim 50, wherein the first and second compositions are the same, or wherein the first and sixth compositions are the same, or
wherein the second and sixth compositions are the same, or
wherein the first, second, and sixth compositions are the same.

52. The tyre of claim 50, wherein the sixth composition comprises an elastic modulus at 70° C. greater than or equal to 5.5 MPa and less than or equal to 7.0 MPa.

53. The tyre of claim 50, wherein the third ratio is less than or equal to 0.120.

54. The tyre of claim 1, wherein the tread band comprises carbon black, silica, and silane coupling agent.

55. The tyre of claim 1, further comprising mini-sidewalls disposed in connecting zones between the tread band and the sidewalls.

56. The tyre of claim 1, further comprising a liner in an axially-internal position relative to the at least one carcass ply.

* * * * *